(12) United States Patent
Kobayashi et al.

(10) Patent No.: US 8,863,871 B2
(45) Date of Patent: Oct. 21, 2014

(54) FUEL CELL APPARATUS FOR VEHICLES

(71) Applicant: Suzuki Motor Corporation, Shizuoka (JP)

(72) Inventors: Kenji Kobayashi, Shizuoka (JP); Shiro Matsumoto, Shizuoka (JP)

(73) Assignee: Suzuki Motor Corporation, Shizuoka (JP)

( * ) Notice: Subject to any disclaimer, the term of this patent is extended or adjusted under 35 U.S.C. 154(b) by 0 days.

(21) Appl. No.: 13/904,143

(22) Filed: May 29, 2013

(65) Prior Publication Data

US 2013/0333965 A1    Dec. 19, 2013

(30) Foreign Application Priority Data

Jun. 15, 2012    (JP) .................. 2012-135406

(51) Int. Cl.
*B60K 1/00* (2006.01)
*B60L 11/18* (2006.01)
*H01M 8/06* (2006.01)

(52) U.S. Cl.
CPC ......... *H01M 8/0662* (2013.01); *B60L 11/1896* (2013.01); *Y02E 60/50* (2013.01)
USPC ...................... 180/65.31; 180/68.2

(58) Field of Classification Search
CPC ....................................... B60K 1/00
USPC ............... 180/65.31, 68.1, 68.2, 68.3, 69.24
See application file for complete search history.

(56) References Cited

U.S. PATENT DOCUMENTS

| | | | | |
|---|---|---|---|---|
| 2,430,759 | A * | 11/1947 | Crise ......................... | 180/68.2 |
| 5,490,572 | A * | 2/1996 | Tajiri et al. .................. | 180/65.1 |
| 7,363,949 | B2 * | 4/2008 | Kubo et al. .................. | 141/82 |
| 7,569,296 | B2 * | 8/2009 | Okazaki ..................... | 429/532 |
| 8,017,278 | B2 * | 9/2011 | Yoshida ..................... | 180/65.31 |
| 8,479,853 | B2 * | 7/2013 | Verbrugge .................. | 180/68.2 |
| 2003/0017798 | A1 | 1/2003 | Hanaya et al. | |
| 2006/0048986 | A1 * | 3/2006 | Bracciano .................. | 180/69.2 |

FOREIGN PATENT DOCUMENTS

| | | |
|---|---|---|
| GB | 2493304 A | 1/2013 |
| GB | 2494078 A | 2/2013 |
| JP | 2010-234992 A | 10/2010 |
| JP | 2012-25294 A | 2/2012 |
| WO | 2013/161804 A1 | 10/2013 |

OTHER PUBLICATIONS

Combined Search and Examination Report under Sections 17 and 18(3) mailed Nov. 26, 2013 in GB1309629.2 (6 pages).

\* cited by examiner

*Primary Examiner* — Hau Phan
(74) *Attorney, Agent, or Firm* — Rothwell, Figg, Ernst & Manbeck, P.C.

(57) ABSTRACT

A cowl top 7 includes a tubular peripheral wall 71 provided above a dash panel 104, with its upper portion 73 extending along a lower edge of a front wind shield 105, the upper portion 73 of the peripheral wall 71 having a front communication aperture 75 and a rear communication aperture 76 formed for air communication between atmosphere and the interior of the tubular peripheral wall 71, and a diluter 6 includes an air inlet aperture area 62 communicating with the interior of an air discharge duct 4, an air outlet aperture area 63 communicating with the interior of the tubular peripheral wall 71, and a dilution chamber 61 made up to introduce fuel gas discharged from a fuel cell stack 3, dilute introduced fuel gas with air introduced through the air inlet aperture area 62, and discharge diluted fuel gas through the air outlet aperture area 63.

10 Claims, 8 Drawing Sheets

FUEL CELL APPARATUS FOR VEHICLES

CROSS-REFERENCE TO RELATED APPLICATION

This application is based upon and claims the benefit of priority from Japanese Patent Application No. 2012-135406, filed Jun. 15, 2012, the entire contents of which are incorporated herein by reference.

BACKGROUND OF INVENTION

1. Technical Field

The present invention relates to a fuel cell apparatus for vehicles, and particularly, to a fuel cell apparatus for vehicles including a fuel cell stack using air as a reaction gas and a coolant.

2. Relevant Art

There are vehicles having a set of fuel cell stacks mounted thereon as a power source, for instance, electric vehicles and hybrid vehicles. There are known structures for mounting fuel cell stacks, including a structure having fuel cell stacks disposed in a space between an under-cover and a floor panel under a rear passenger seat (refer to Japanese Patent Application Laying Open Publication JP 2010-234992 A), and a structure having fuel cell stacks disposed in an engine room (refer to Japanese Patent Application Laying Open Publication JP 2012-25294 A).

Fuel cell stacks are each made as a combination of a set of one or more unit stacks, and a stack casing constituting an outer cover of the unit stack set. Each unit stack is composed of multi-layered fuel cells, and a fuel cell enclosure integrally enclosing the fuel cells. The fuel cell enclosure has an air introducing aperture for introducing air to internal air supply channels (sometimes referred to as cathode-end channels), an air out-leading aperture for leading out unused air from air discharge channels communicating with the air supply channels, a fuel gas channel connecting part for supplying fuel gas being hydrogen gas to internal fuel gas channels (sometimes referred to as anode-end channels), and a purge gas channel connecting part for discharging a purged gas (referred herein to as a purge gas) containing hydrogen gas from purge gas channels communicating with the fuel gas channels.

For the fuel gas, gaseous hydrogen filled in a high-pressure hydrogen bomb is pressure-reduced to a desirable pressure at a pressure reducing valve, and supplied to the fuel gas line connecting part, by a quantity as needed. Air is taken from outside a vehicle, conditioned through a heat exchanger and a humidifier to a combination of temperature and humidity needed for high-efficient power generation, and supplied to the air introducing aperture. Fuel cells have their fuel electrodes and air electrodes, which are connected to associated apertures or channel connecting parts through individual networks of channels formed in the fuel cell enclosure.

At each fuel cell stack, the stack casing has 'communication aperture areas' (referred herein sometimes simply to as 'aperture areas') communicating with apertures formed in fuel cell enclosures of the one or more unit stacks, as necessary.

Power generating reactions in fuel cells produce by-product water at their fuel electrodes, spreading moisture vapor in channels conducting fuel gas. Some channels may have condensed vapor or dew or clustered water, undergoing an occasional blocking.

In this regard, fuel cell apparatuses have a purge function of purging fuel gas channels, flushing out water and vapor, for the prevention of blocking, and are adapted to make such a purge irrespective of the vehicular running condition. Such fuel cell apparatuses are adapted to make a purge even in a normal operation, as necessary for an adjustment of stack internal pressure or such. Upon a purge at a fuel cell stack, there are resultant purge gases lead out of purge gas channel connecting parts provided at fuel cell enclosures of unit stacks, and joined together to discharge from a purge gas line connecting part provided at a stack casing of the fuel cell stack to an associated purge gas line.

Such purge gases contain fuel gas (hydrogen gas), and are diluted to vent into atmosphere. In this regard, purge gases containing fuel gas (hydrogen gas) are inflammable, and have tendencies to inflame if the hydrogen concentration exceeds 4% by volume. Further, purge gases containing fuel gas (hydrogen gas) have tendencies to instantaneously inflame if the hydrogen concentration exceeds 18% by volume. Accordingly, purge gases containing fuel gas (hydrogen gas) to be vented to atmosphere should have hydrogen concentrations not exceeding 4% by volume.

SUMMARY OF INVENTION

In the mounting structure for fuel cell stacks disclosed in the Publication JP 2010-234992 A, fuel gas (hydrogen gas) vented from a fuel cell stack tends to stagnate in regions under a floor panel, where natural ventilation air streams (sometimes simply referred to as air streams) have decreased tendencies to flow. This mounting structure is thus accompanied by anxieties about fuel gas stagnant under the floor panel with potential leakage into a passenger room.

In the mounting structure for fuel cell stacks disclosed in the Publication JP 2012-25294 A, fuel gas (hydrogen gas) vented from a fuel cell stack may flow along some vent paths with anxieties about potential stagnation in an engine room.

The preset invention has been devised in view of such issues. It therefore is an object of the present invention to provide a fuel cell apparatus for vehicles allowing for fuel gas (hydrogen gas) vented from a fuel cell stack to undergo an ensured dilution with an enhanced integrity.

To achieve the object descried, according to an aspect of the present invention, there is provided a fuel cell apparatus for vehicles including a fuel cell stack arranged in an engine room located in a vehicle front section and partitioned by a dash panel relative to a passenger room, and adapted to take in air through an air in-taking aperture area to use as a reaction gas and a coolant, and discharge air through an air discharging aperture area communicating with an interior space of an air discharge duct. This fuel cell apparatus for vehicles includes a cowl top member, and a diluter. The cowl top member includes a tubular peripheral wall provided above the dash panel with an upper portion thereof extending along a lower edge of a front windshield, and a set of communication apertures formed through the upper portion of the tubular peripheral wall for air communication between atmosphere and an interior space of the tubular peripheral wall. The diluter includes an air inlet aperture area communicating with the interior space of the air discharge duct, an air outlet aperture area communicating with the interior space of the tubular peripheral wall, and a dilution chamber made up to introduce fuel gas discharged from the fuel cell stack, dilute introduced fuel gas with air introduced through the air inlet aperture area, and discharge diluted fuel gas through the air outlet aperture area.

DETAILED DESCRIPTION OF EMBODIMENTS

There will be described a fuel cell apparatus for vehicles (referred herein to as a fuel cell apparatus) according to a respective embodiment of the preset invention, into details, with reference to the drawings.

It is noted that the drawings are illustrative, including differences from practices, such as those in magnitudes or proportions of dimensions or shapes. Drawings may include also differences in between such as those in ratios or relations of dimensions or shapes. It also is noted that drawings have coordinate systems defined by arrows as legends to identify vehicle longitudinal directions, transverse directions, and vertical directions, for the convenience in description.

(First Embodiment)

Figure 1:
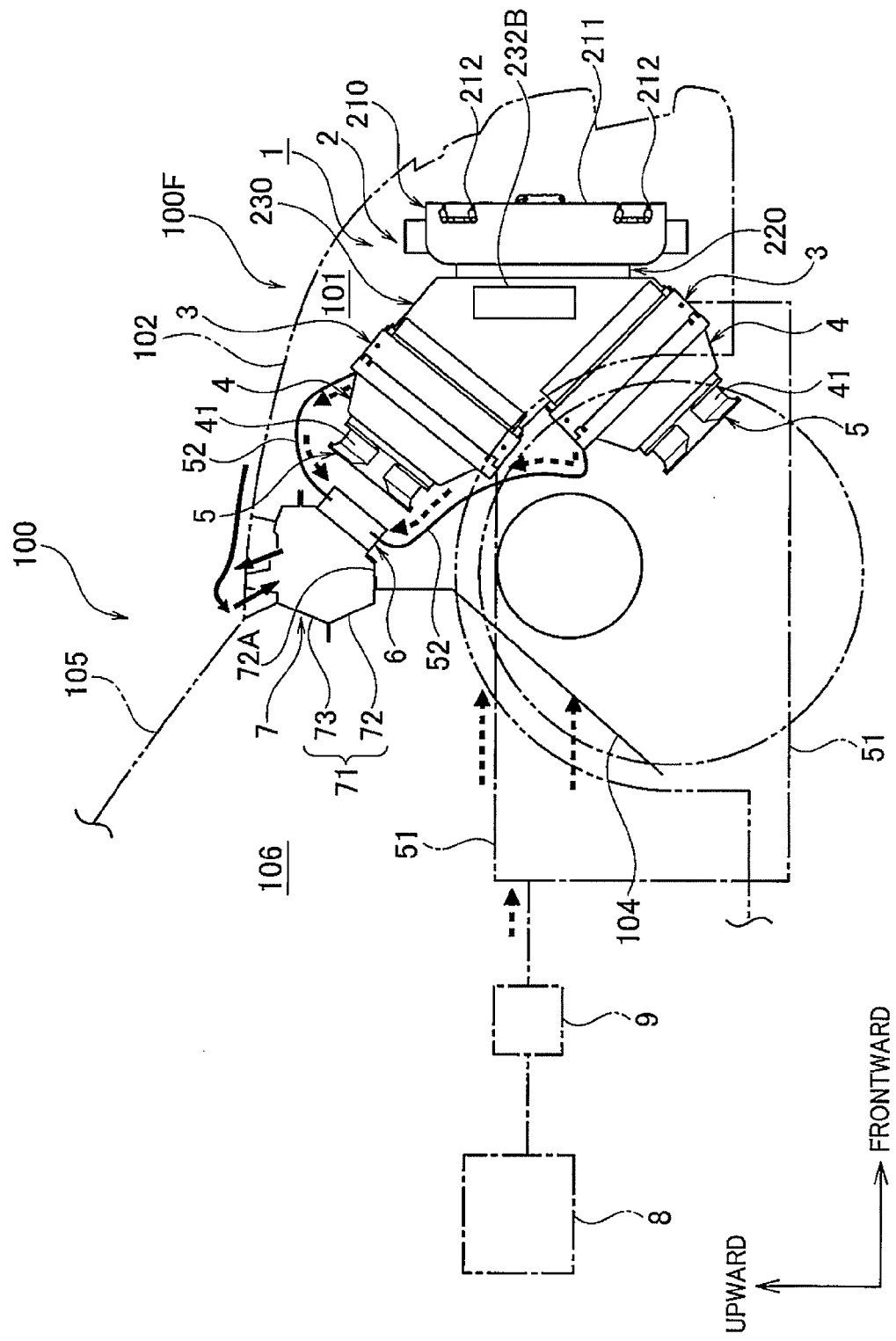
FIG. 1 is a side elevation of a front section of a vehicle including a fuel cell apparatus for vehicles according to a first embodiment of the preset invention.
Figure 2:
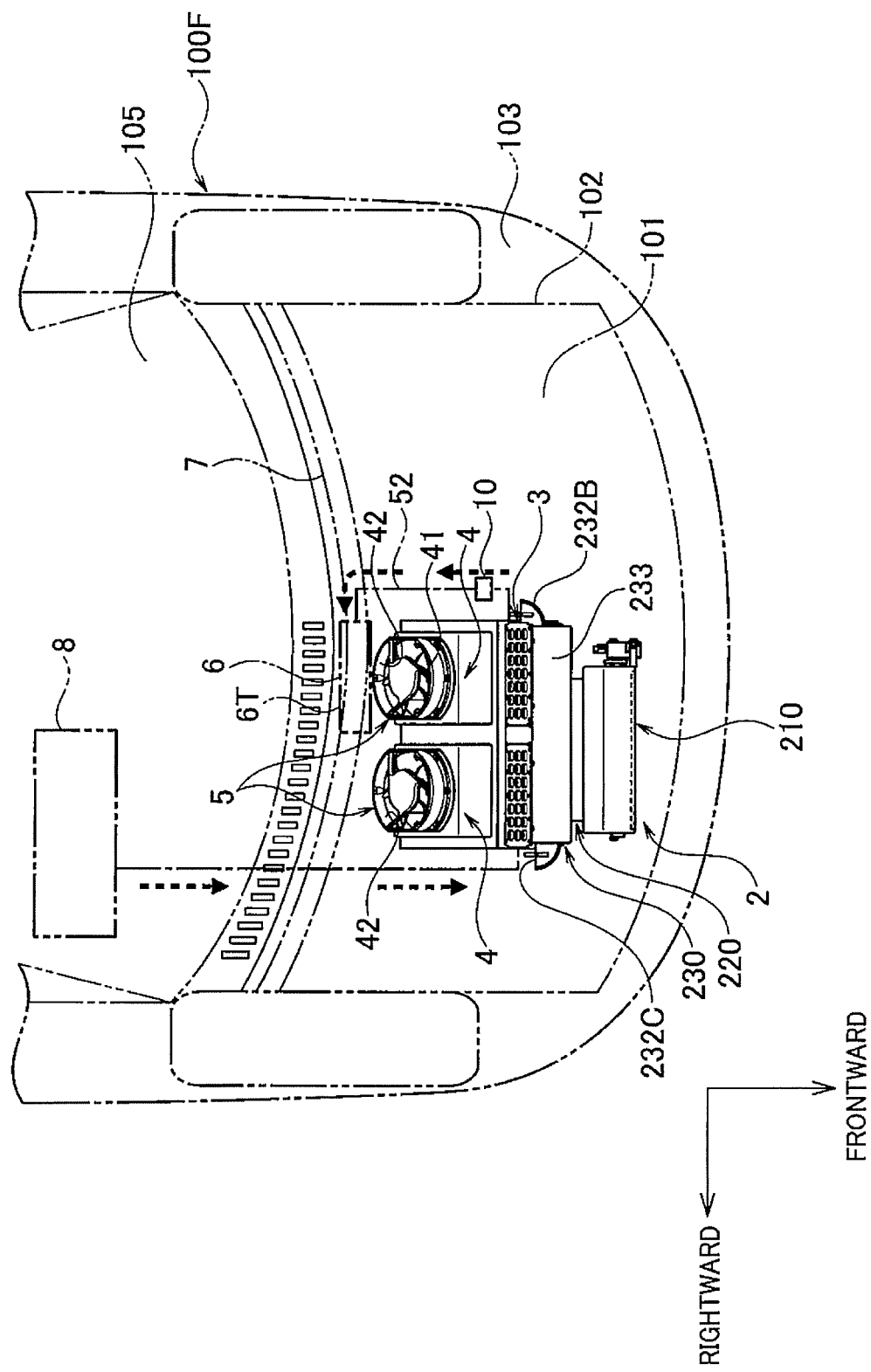
FIG. 2 is a plan view of the vehicle front section.

FIG. 1 and FIG. 2 show, in a side elevation and a plan view, respectively, a vehicle front section 100F including a fuel cell apparatus 1 according to a first embodiment of the present invention. The fuel cell apparatus 1 is arranged in an engine room 101 disposed at the front section 100F of a vehicle 100. The engine room 101 is defined from around with an engine hood 102, side panels 103, a dash panel (or panel) 104, and a cowl top 7. The engine room 101 is partitioned by the dash panel (or panel) 104 relative to a passenger room 106. The engine room 101 accommodates therein, besides the fuel cell apparatus 1, unshown drive motors, inverters, radiator, etc.

The fuel cell apparatus 1 includes an air suction duct 2, a pair of fuel cell stacks 3, two pairs of air discharge ducts 4 arranged each pair for either fuel cell stack 3, air discharge fans 5 each respectively arranged as an air blowing fan for any one of the air discharge ducts 4, a diluter 6, and the cowl top 7. Each air discharge fan 5 is provided at a discharge port of an associated air discharge duct 4. It is noted that the interior of the diluter 6 communicates with the interior of the cowl top 7.

(Air Suction Duct)

Figure 3:
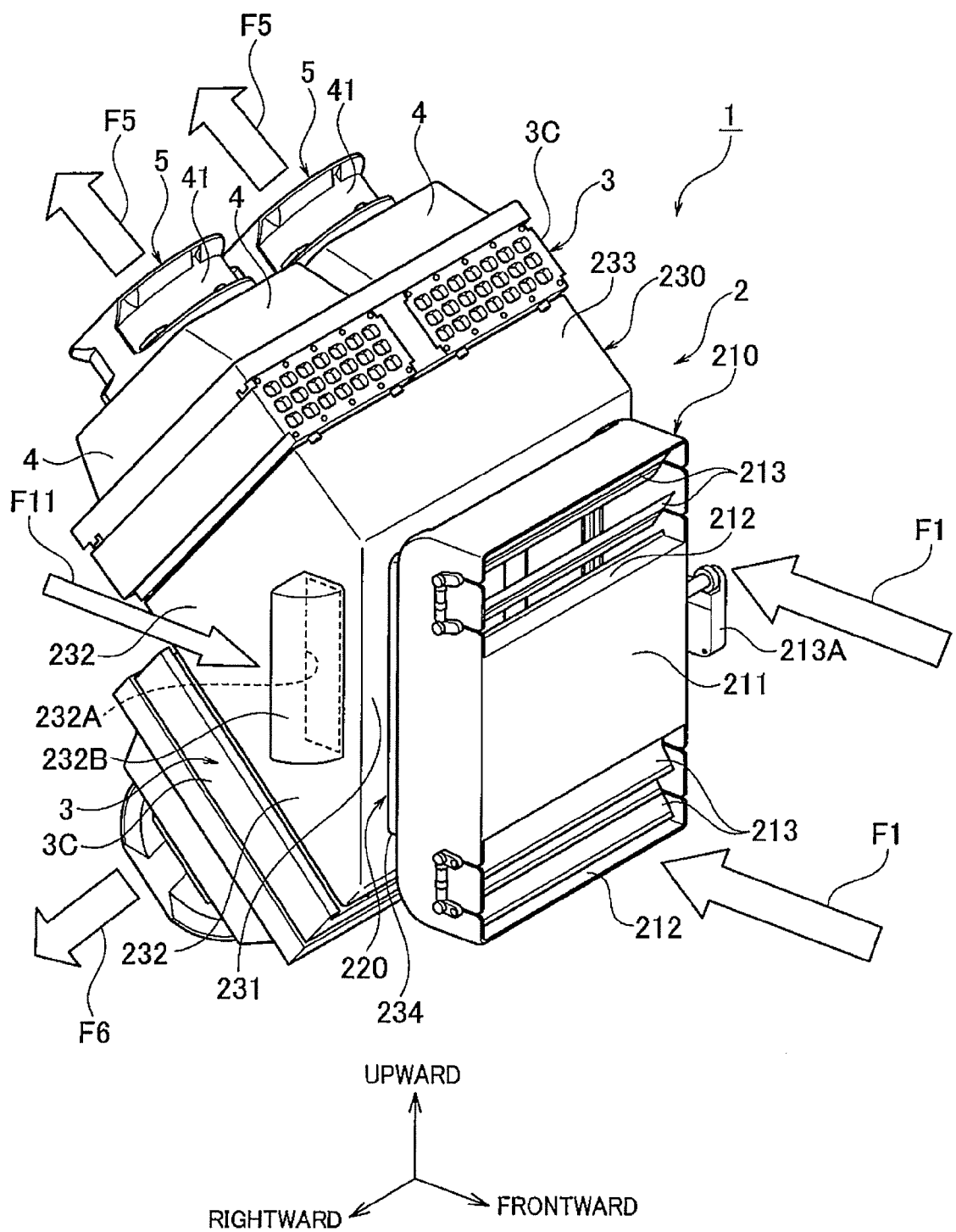
FIG. 3 is a perspective view of an essential portion of the fuel cell apparatus.

As shown in FIG. 3, the air suction duct 2 has a first duct portion 210, a second duct portion 220, and a third duct portion 230. The first duct portion 210 has a box structure outlined substantially in a cuboid shape. The first duct portion 210 includes a front side panel 211 at the vehicle-longitudinally front side. This panel 211 has a pair of first air intake ports 212 formed at vertically spaced two locations. The first air intake ports 212 have their shutters 213. These shutters 213 are driven with rotational drive forces transmitted from a shutter driver 213A, for their rotations to open or close the first air intake ports 212. Moreover, as shown in FIG. 6, the first duct portion 210 has a rear side panel 214 opposing the front side panel 211 and formed with an opening 214A.

Figure 4:
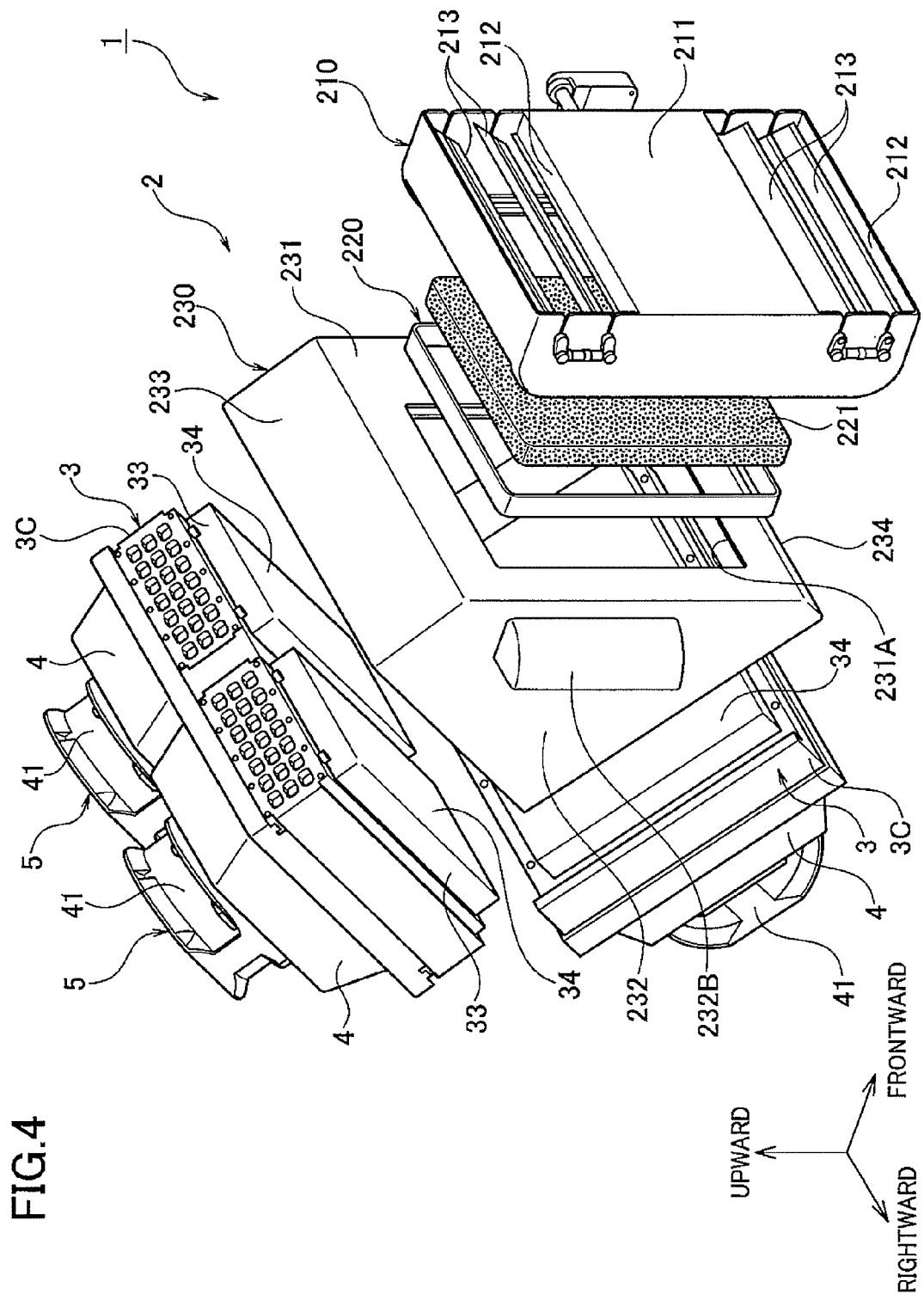
FIG. 4 is an exploded perspective view of an essential portion of the fuel cell apparatus.
Figure 6:
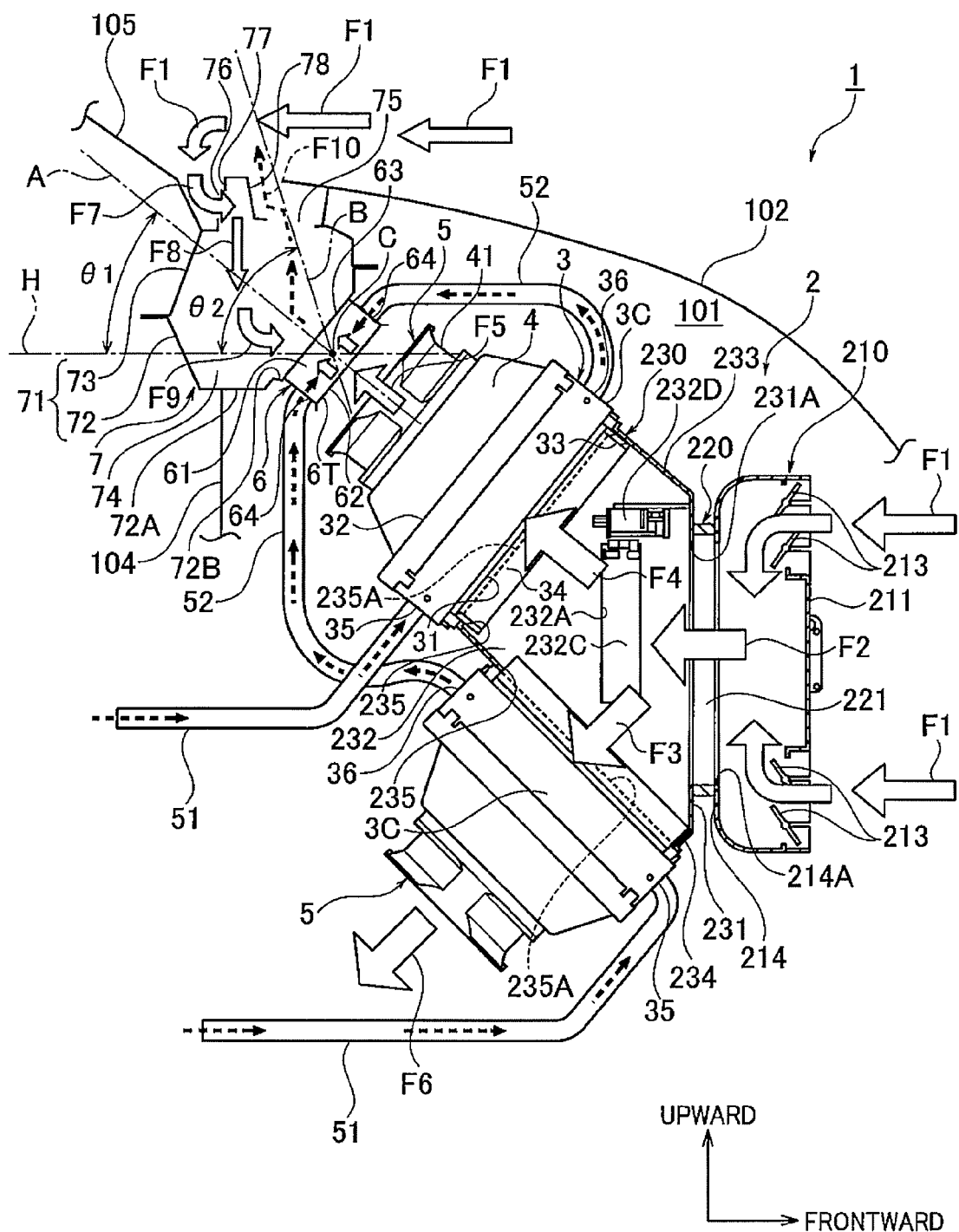
FIG. 6 is a sectional view along line VI-VI of FIG. 5.

As shown in FIG. 6, the second duct portion 220 is made as a tubular body rectangular in a section perpendicular to the axial direction. The second duct portion 220 is attached to the rear side panel 214 of the first duct portion 210, so that the interior of that communicates with the inside of the opening 214A in the rear side panel 214. Moreover, as shown in FIG. 4, the second duct portion 220 has a rectangular filter 221 accommodated therein. It is noted that the second duct portion 220 has a relatively short axial length nearly equal to the thickness of the filter 221.

As shown in FIG. 4 and FIG. 6, the third duct portion 230 is made in the form of a hollow box outlined substantially in a trapezoidal prismatic shape. The third duct portion 230 has a front side panel 231 disposed at the vehicle-longitudinally front side, a pair of lateral side panels 232 each disposed on either of vehicle-transversely opposite two sides, an upside panel 233, and a downside panel 234. The front side panel 231 is formed with an upstream opening 231A, and the second duct portion 220 is attached at its downstream end to the front side panel 231.

As shown in FIG. 6, the third duct portion 230 has a vehicle-longitudinally rear portion formed with a pair of upper and lower downstream openings 235. The downstream openings 235 have their aperture areas 235A oriented to be substantially perpendicular to each other. At the upper downstream opening 235 of the third duct portion 230, a rearward extension of its center axis is upwardly diagonally inclined relative to the vehicle-longitudinal direction. At the lower downstream opening 235 of the third duct portion 230, a rearward extension of its center axis is downwardly diagonally declined relative to the vehicle-longitudinal direction.

Figure 5:
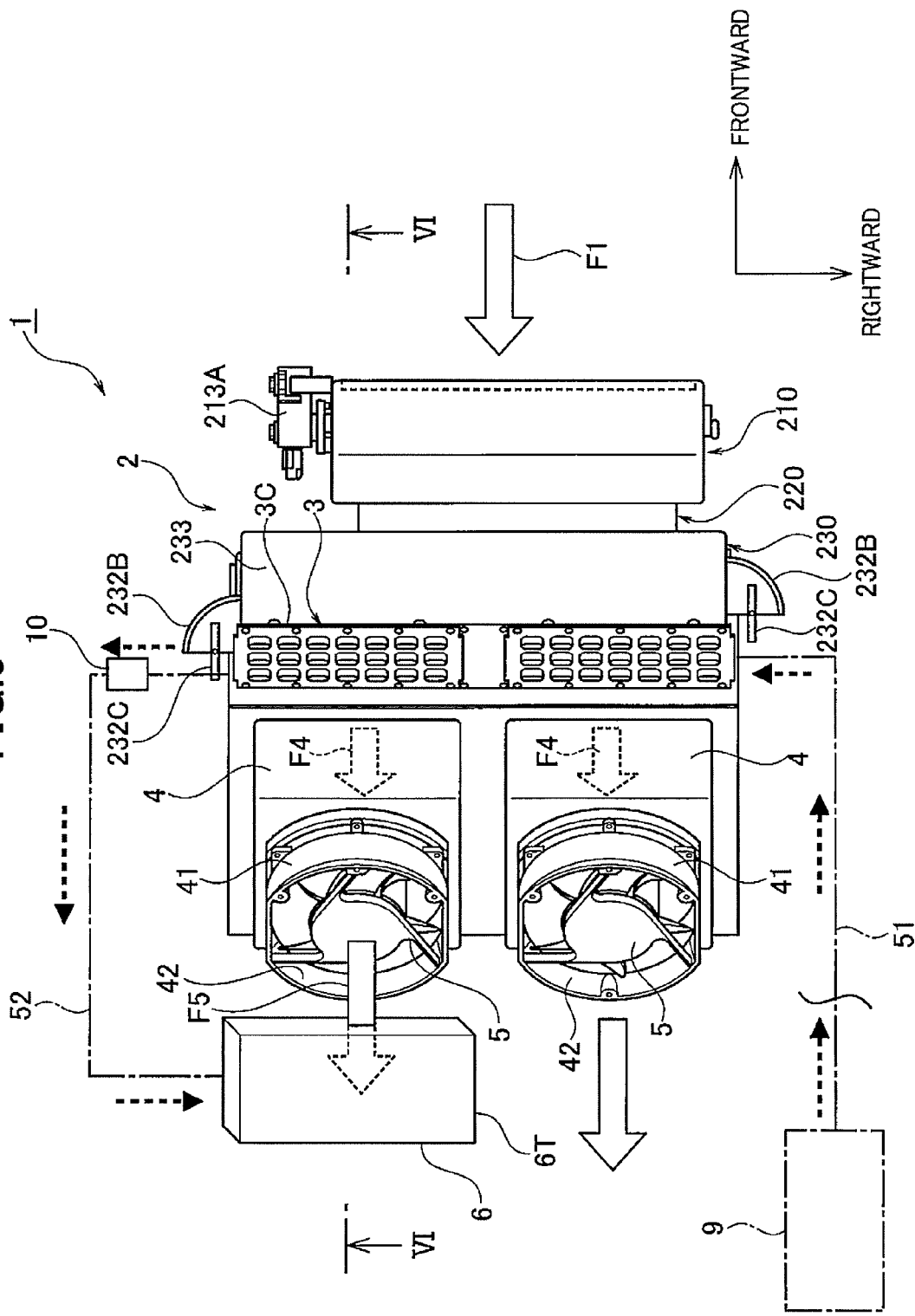
FIG. 5 is a plan view of an essential portion of the fuel cell apparatus.

As shown in FIG. 3 and FIG. 5, each lateral side panel 232 has a second air intake port 232A formed therein. The second air intake port 232A is formed in a rectangular shape elongate in the vehicular vertical direction. The second air intake port 232A is covered from outside with a hood member 232B opening rearward to take in air from vehicle-longitudinally rear side. That is, the second air intake port 232A is implemented by provision of the hood member 232B to open substantially in the vehicle-longitudinally rearward direction. Moreover, the hood member 232B has a shutter 232C accommodated therein to open or close the second air intake port 232A.

As shown in FIG. 6, the shutter 232C is operable for open-close operations with drive forces transmitted from a shutter driver 232D. The shutter driver 232D is fixed on the interior wall of an associated lateral side panel 232. The shutter 232C is adapted to open when the atmospheric temperature is lower than a prescribed temperature (as a lower limit temperature of a temperature range affording the fuel cell stacks 3 to work as necessary), to introduce warm air from inside the engine room 101 into the third duct portion 230. It is noted that this embodiment employs a pair of individually controllable shutter drivers 232D fixed on a pair of lateral side panels 232, for driving a pair of shutters 232C provided at a pair of second air intake ports 232A. Instead, there may be employed a common shutter driver 232D installed on either lateral side panel 232, to drive the pair of shutters 232C.

(Fuel Cell Stacks)

Figure 7:
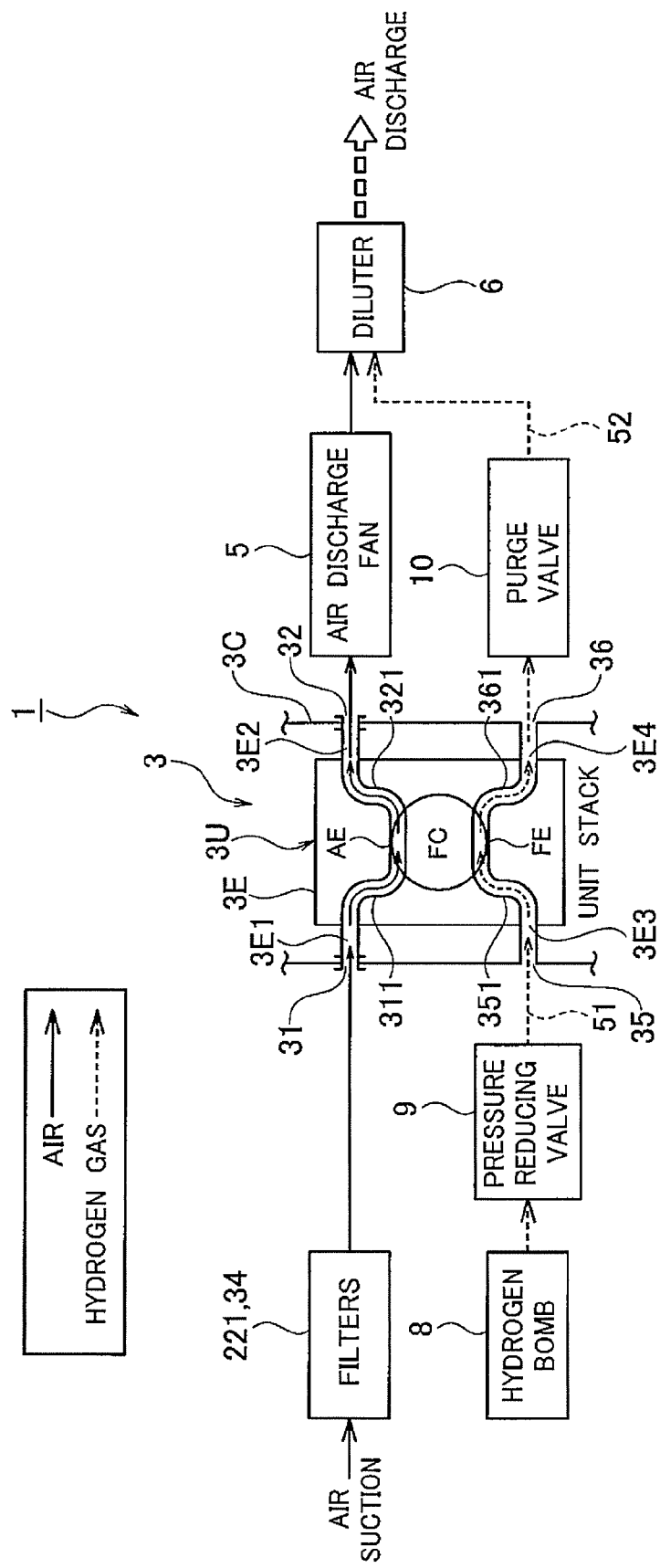
FIG. 7 is a block diagram of the fuel cell apparatus.

The fuel cell stacks 3 have a configuration including stacked (i.e. multi-layered) fuel cells. Each fuel cell includes an electrolyte film, a fuel (hydrogen) electrode, an air (oxygen) electrode, and a separator. More specifically, the fuel cell stacks 3 are each made as a combination of a set of one or more unit stacks 3U (refer to FIG. 7), and a stack casing 3C (refer to FIG. 3, FIG. 4, FIG. 5, and FIG. 6) constituting an outer cover of the unit stack set. As shown in FIG. 7, each unit stack 3U is composed of multi-layered fuel cells FC, and a fuel cell enclosure 3E integrally enclosing the fuel cells FC. At each unit stack 3U, the fuel cell enclosure 3E has an air introducing aperture 3E1 for introducing air to internal air supply channels 311, an air out-leading aperture 3E2 for leading out unused air from air discharge channels 321 communicating with the air supply channels 311, a fuel gas channel connecting part 3E3 for introducing fuel gas being hydrogen gas to internal fuel gas channels 351, and a purge gas channel connecting part 3E4 for leading out a purge gas containing hydrogen gas from purge gas channels 361 communicating with the fuel gas channels 351.

As shown in FIG. 3 and FIG. 4, at each fuel cell stack 3, the stack casing 3C has a vehicle-transversely elongate rectangular parallelepiped shape in the contour. As shown in FIG. 6, at each fuel cell stack 3, the stack casing 3C has an air in-taking aperture area 31 constituting the front one of vehicle-longitudinally opposing mutually parallel two sides of the rectangular parallelepiped shape, and an air discharging aperture area 32 constituting the rear one of those two sides. Each fuel cell stack 3 takes in air through the air in-taking aperture area 31 of the stack casing 3C, to use as a reaction gas and a coolant in each unit stack 3U.

As shown in FIG. 6, at each fuel cell stack 3, the stack casing 3C has a filter holder 33 provided in front of the air in-taking aperture area 31 and formed in the shape of a short rectangular duct. The filter holder 33 has a rectangular planer filter 34 accommodated therein. At each fuel cell stack 3, the stack casing 3C is connected at the end of the air in-taking aperture area 31 to an associated downstream opening 235 of the third duct portion 230, so that their interior spaces communicate with each other.

At each fuel cell stack 3, air is let through the filter 34, and runs through the air in-taking aperture area 31 into the stack casing 3C, where incoming air is introduced into each unit stack 3U. As shown in FIG. 7, at each unit stack 3U, introduced air from an air introducing aperture 3E1 of the fuel cell enclosure 3E is conducted along internal air supply channels 311, concurrently working to cool associated regions in the unit stack 3U, thus being heated, and distributed to air electrodes AE of fuel cells FC in the unit stack 3U, where it is used for reactions to generate electricity. Unused air is conducted along air discharge channels 321 communicating with the air supply channels 311, and lead out of the unit stack 3U through an air out-leading aperture 3E2 of the fuel cell enclosure 3E, to be discharged as temperature-raised air through the air discharging aperture area 32 of the stack casing 3C, out of the fuel cell stack 3.

As shown in FIG. 6, at each fuel cell stack 3, the stack casing 3C has a fuel gas line connecting part 35 connected to a downstream end of a fuel gas line 51 for supply. The fuel gas line 51 serves to supply fuel gas under a controlled pressure to the fuel gas line connecting part 35. When supplied to the fuel gas line connecting part 35, the fuel gas is introduced to each unit stack 3U. As shown in FIG. 7, at each unit stack 3U, an introduced fuel gas from a fuel gas channel connecting part 3E3 of a fuel cell enclosure 3E is conducted along internal fuel gas channels 351, and distributed to fuel electrodes FE of fuel cells FC in the unit stack 3U, where it is consumed for reactions to generate electricity. Since these reactions produce by-product water, the fuel cell apparatus 1 is operated, as needed, to open a purge valve 10 for use of the gas pressure to purge the fuel gas channels 351. Then, a mixture of fuel gas (hydrogen gas), moisture, or such is flushed as a purge gas along purge gas channels 361 communicating with the fuel gas channels 351, and lead through a purge gas channel connecting part 3E4 of the fuel cell enclosure 3E, out of the unit stack 3U, to discharge through a purge gas line connecting part 36 of the stack casing 3C, out of the fuel cell stack 3, into an associated purge gas line 52.

As shown in FIG. 2 and FIG. 5, there are paired air discharge ducts 4 fixed on a rear side of each fuel cell stack 3, in positions neighboring each other in the vehicle-transverse direction. As shown in FIG. 3 and FIG. 4, each air discharge duct 4 is formed in a tubular rectangular truncated conical shape, with a bottom side constituting an upstream end of the duct 4, and a top side constituting a downstream end of the duct 4. The upstream end is opened, while as shown in FIG. 2 and FIG. 5 the downstream end is closed in the manner of leaving a central aperture as an open air discharge port 42. As shown in FIG. 6, at each fuel cell stack 3, the stack casing 3C is connected at the downstream end, i.e., at the end of the air discharging aperture area 32 to the upstream end of an associated air discharge duct 4, with their interior spaces communicating with each other. At each air discharge duct 4, the downstream end is directionally extended by provision of a circular tubular fan cover 41, so that the fan cover 41 serves at a downstream end thereof to constitute a substantive air discharge port of the air discharge duct 4. As shown in FIG. 2 and FIG. 5, each fan cover 41 has an air discharge fan 5 installed therein.

(Diluter)

As shown in FIG. 2 and FIG. 5, the diluter 6 is composed of a tubular member 6T formed in a rectangular cuboid box shape, that is, a hollow rectangular body. As shown in FIG. 6, the diluter 6 has a rectangular cuboid-shaped dilution chamber 61 made up by the portion of a wall of the tubular member 6T. The diluter 6 has an air inlet aperture area 62 constituting a vehicle-longitudinally front side of the tubular member 6T, and an air outlet aperture area 63 constituting a vehicle-longitudinally rear side of the tubular member 6T. The air inlet aperture area 62 is arranged so as to face the downstream end of a fan cover 41 of an associated air discharge fan 5, which blows air into the dilution chamber 61.

As shown in FIG. 6, the diluter 6 has two purge gas line connecting parts 64 provided at lateral sides of the dilution chamber 61, where two purge gas lines 52 are connected at downstream ends thereof, respectively. Upstream ends of the two purge gas lines 52 are connected to purge gas line connecting parts 36 provided at stack casings 3C of the pair of fuel cell stacks 3, respectively. At the diluter 6, the dilution chamber 61 has purge gases containing hydrogen flowing therein from the two purge gas lines 52, and air blown thereto by the associated air discharge fan 5 from a specific air discharge duct 4. Therefore, at the dilution chamber 61, incoming flow gases are to be diluted, as well as hydrogen gas contained therein.

In the fuel cell apparatus 1, the diluter 6 can be put in service upon a purge performed, irrespective of the vehicular running condition, for flushing out condensed vapor or dew or water in, to prevent a blocking of, fuel gas channels (sometimes referred to as anode-end channels) in one or more fuel cell stacks 3. The diluter 6 has air blown into the dilution chamber 61 by an associated air discharge fan 5 from a specific air discharge duct 4, to dilute purge gases containing fuel gas (hydrogen gas). In this regard, the air inlet aperture area 62 of the diluter 6 is not required to face both of air discharge fans 5 vehicle-transversely arrayed in a pair on a stack casing 3C of a specific fuel cell stack 3. Therefore, as shown in FIG. 2 and FIG. 5, the air inlet aperture area 62 of the diluter 6 is arranged to simply face one of such paired air discharge fans 5. In this embodiment, as shown in FIG. 2, between air discharge fans 5 vehicle-transversely arrayed in a pair on a stack casing 3C of a specific fuel cell stack 3, that one which is nearer to a vehicle-transversely central position of the vehicle front section 100F is selected as an opponent for the air inlet aperture area 62 of the diluter 6 to face.

A shown in FIG. 6, the cowl top 7 is a built-up member including a tubular peripheral wall 71, which is provided above the dash panel 104, with an upper portion thereof extending along a lower edge of a front windshield 105. The tubular peripheral wall 71 is composed of a gutter-shaped bottom member 72 constituting a lower portion thereof, and a top member 73 assembled on the bottom member 72, constituting the above-noted upper portion. The upper portion and the lower portion of the tubular peripheral wall 71 cooperatively define an internal space 74 of the peripheral wall 71. The lower portion of the peripheral wall 71 composed of the bottom member 72 has a planer bottom region 72A that extends, at a front part thereof, vehicle-longitudinally frontward from right above (i.e., from the position of a top edge of) the dash panel 104. The bottom member 72 has a bottom aperture 72B formed therein for air communication between the internal space 74 of the peripheral wall 71 and the dilution chamber 61 of the diluter 6. The upper portion of the peripheral wall 71 composed of the top member 73 has, at a top part thereof, a set of communication apertures including a front communication aperture 75 and a rear communication aperture 76 formed therethrough for air communication between atmosphere and the internal space 74 of the peripheral wall 71. The front communication aperture 75 is vehicle-longitudinally frontward spaced from the rear communication aperture 76. The front communication aperture 75 is made up to let out purge gases containing fuel gas (hydrogen gas) additionally diluted with air in the internal space 74 of the peripheral wall 71, to atmosphere. As shown in FIG. 6, the rear communication aperture 76 is made up to let in natural ventilation air streams (represented by an arrow legend F7) after collision with the font windshield 105, to the internal space 74 of the peripheral wall 71. It is noted that the term 'natural ventilation air streams' refers to flows or streams of atmospheric air about a vehicle, whether it is running or not.

Incidentally, in an aspect, the fuel cell apparatus 1 for vehicles includes a fuel cell stack 3 arranged in an engine room 101 located in a vehicle front section 100F and partitioned by a dash panel 104 relative to a passenger room 106, and adapted to take in air through an air in-taking aperture area 31 to use as a reaction gas and a coolant, and discharge air through an air discharging aperture area 32 communicating with an interior space of an air discharge duct 4. This fuel cell apparatus 1 includes a cowl top member 7, and a diluter 6. The cowl top member 7 includes a tubular peripheral wall 71 provided above the dash panel 104 with an upper portion 73 thereof extending along a lower edge of a front windshield 105, and a set of communication apertures 75 and 76 formed through the upper portion 73 of the tubular peripheral wall 71 for air communication between atmosphere and an interior space 74 of the tubular peripheral wall 74. And, the diluter 6 includes an air inlet aperture area 62 communicating with the interior space of the air discharge duct 4, an air outlet aperture area 63 communicating with the interior space 74 of the tubular peripheral wall 71, and a dilution chamber 61 configured to introduce fuel gas discharged from the fuel cell stack 3, dilute introduced fuel gas with air introduced through the air inlet aperture area 62, and discharge diluted fuel gas through the air outlet aperture area 63.

Instead, there may be a diluter 6 made up with an air inlet aperture area 62 arranged to take in air discharged from a discharge port of the air discharge duct 4, an air outlet aperture area 63 arranged to let air out, and a dilution space (in the dilution chamber 61) arranged to introduce fuel gas discharged from the fuel cell stack 3, and mix air and fuel gas for dilution, the dilution space communicating through the air outlet aperture area 63 with the interior space 74 of the tubular peripheral wall 71 of the cowl top member 7.

In another aspect, the fuel cell apparatus 1 includes a fuel gas collector made up to collect fuel gas discharged from the fuel cell stack 3, and a fuel gas introducer made up to introduce fuel gas collected by the fuel gas collector into the dilution chamber 61 of the diluter 6.

In another aspect, the fuel gas collector includes a purge gas line 52 connected to the fuel cell stack 3, and the fuel gas introducer includes a line connecting part 64 provided between the purge gas line 52 and the dilution chamber 61 of the diluter 6.

As shown in FIG. 6, in a side elevation of the vehicle 100, the fuel cell apparatus 1 has a combination of a first reference line A set up as a center line passing a center of the air inlet aperture area 62 and a center of the air outlet aperture area 63 of the diluter 6 and a second reference line B set up as a center line passing a geometrical midpoint C of the dilution chamber 61 and a vehicle-longitudinally central position of the front communication aperture 75, such that the first reference line A is inclined relative to a vehicular horizontal plane H including a vehicle-longitudinally horizontal line, at a first angle $\theta 1$ smaller than a second angle $\theta 2$ by which the second reference line B is inclined relative to the vehicular horizontal plane H, and the rear communication aperture 76 resides within an angular range between the first reference line A and the second reference line B.

The rear communication aperture 76 is formed in a rising planer part 77 of the top member 73 constituting the upper portion of the tubular peripheral wall 71. The rear communication aperture 76 thus has an opening confronting the lower edge of the front windshield 105. The top member 73 is formed with a planar guiding part 78 in a position facing the rear communication aperture 76. The planer guiding part 78 is vehicle-longitudinally frontward spaced from the rear communication aperture 76. The planar guiding part 78 is set up to guide streams of air introduced from the rear communication aperture 76, toward the air outlet aperture area 63 of the diluter 6.

FIG. 7 shows flows of air and hydrogen in the fuel cell apparatus 1, in a block diagram, partly in a type section of a fuel cell stack 3. As shown in FIG. 7, each fuel cell stack 3 is supplied with a conditioned fuel gas containing hydrogen (gas), and conditioned air containing oxygen (gas), and discharges a purge gas when purged, and unused air. For fuel gas supply, high-pressure compressed hydrogen gas stored in a hydrogen bomb 8 is pressure-reduced at a pressure reducing valve 9, and conducted through a fuel gas line 51 to a fuel gas line connecting part 35 of a stack casing 3C. When the fuel cell stack 3 is purged with a purge valve 10 open, a purge gas is discharged from a purge gas line connecting part 36 of the stack casing 3C to a purge gas line 52. For air supply to the fuel cell stack 3, atmospheric air is suctioned through filters 221 and 34, and introduced to an air in-taking aperture area 31 of the stack casing 3C, and unused air is lead out from an air discharging aperture area 32 of the stack casing 3C, and discharged by an air discharge fan 5. Purge gases are collected at the diluter 6, where they are diluted with air sent by an air discharge fan 5.

At the diluter 6, purge gases are diluted below a lower limit of inflammable hydrogen concentration, to release outside.

(Operations and Effects of Fuel Cell Apparatus)

Description is now made of operations and effects of the fuel cell apparatus 1 according to this embodiment. Upon a startup of the fuel cell apparatus 1, hydrogen gas and air is introduced to the fuel cell stacks 3 in the fuel cell apparatus 1. More specifically, as shown in FIG. 7, high-pressure compressed hydrogen gas stored in the hydrogen bomb 8 is pressure-reduced at a pressure reducing valve 9, and introduced as fuel gas to a fuel gas line connecting part 35 at each fuel cell stack 3. On the other hand, atmospheric air is suctioned into the air suction duct 2, through the filters 221, and introduced to the air in-taking aperture area 31 at each fuel cell stack 3. It is noted that at such fuel cell stacks 3, supplied air is not simply used for reactions to generate electricity, but also is functional as a coolant for cooling the fuel cell stack 3. Unused air is discharged from the air discharging aperture area 32 at each fuel cell stack 3. Then, as shown in FIG. 6, specific air discharge fans 5 serve to force streams of air F5 into the air inlet aperture area 62 of the diluter 6.

When a purge valve 10 is operated to open at an arbitrary fuel cell stack 3, the purge gas line connecting part 36 delivers a purge gas containing fuel gas (hydrogen gas), which is conducted by an associated purge gas line 52, and introduced through an associated purge gas line connecting part 64 of the diluter 6, to the dilution chamber 61. In the dilution chamber 61 there are purge gases containing fuel gas (hydrogen gas) mixed and diluted with flows of air F5 sent from the specific air discharge fans 5. Then, a gaseous mixture of air and purge gases diluted in the dilution chamber 61 strikes through the air outlet aperture area 63 of the diluter 6, into the interior space 74 of the cowl top's tubular peripheral wall 71. The tubular peripheral wall 71 thus has gaseous mixtures introduced in the interior space 74, which are released outside (into atmosphere) through the front communication aperture 75 of the top member 73.

As shown in FIG. 6, such as when the vehicle is running, the interior space 74 of the cowl top peripheral wall 71 has negative pressures due to effects of natural ventilation air streams F1. In this situation, natural ventilation air streams F1 after collision with the front windshield 105 have tendencies to flow through the rear communication aperture 76 into the interior space 74. Then, the interior space 74 of the cowl top peripheral wall 71 has purge gases incoming thereto (from the diluter 6 where they have been once diluted) and additionally mixed and diluted with flows of air F7 and F8 inflowing through the rear communication aperture 76. Therefore, when released outside the vehicle, the resultant mixture is diluted with air discharged from a specific fuel cell stack 3, to a hydrogen concentration well decreased from the target hydrogen concentration being 4% by volume. In other words, purge gases containing fuel gas (hydrogen gas) are treated by the combination of a mixing dilution using air discharged inside the fuel cell apparatus 1, and an additional mixing dilution making use of natural ventilation air streams, before their release to atmosphere (in spatial regions defined by and between the engine hood 102 and the top member 73 of the cowl top peripheral wall 71). Purge gases containing fuel gas (hydrogen gas) are well diluted, when released in spatial regions enclosed by the engine hood 102 and the top member 73 of the cowl top peripheral wall 71, to be free to escape through gaps between the engine hood 102 and the top member 73. Therefore, according to this embodiment, the fuel cell apparatus 1 is adapted to discharge gases with a secured integrity, even when discharging fuel gas (hydrogen gas) through a purge gas line 52 of a fuel cell stack 3. Such being the case, the fuel cell apparatus 1 is afforded for use of air from an air discharge fan 5 and natural ventilation air streams to stepwise dilute purge gases containing fuel gas (hydrogen gas), without needing a large-capacity diluter, thus allowing for a light-weighted vehicle with a down-sized diluter 6.

According to this embodiment, the rear communication aperture 76 is formed along the lower edge of the front windshield 105, whereby natural ventilation air streams after collision with the front windshield 105 have increased tendencies to flow through the rear communication aperture 76 into the interior space 74 of the cowl top peripheral wall 71. As a result, purge gases containing fuel gas (hydrogen gas) can be promptly mixed up with air for the dilution. Moreover, in this embodiment, the front communication aperture 75 is arranged in position to provide gaseous mixtures including air and fuel gas (hydrogen gas) introduced to the interior space 74 of the cowl top peripheral wall 71, with enhanced tendencies to flow outside. That is, the front communication aperture 75 is disposed in a position vehicle-longitudinally frontward spaced from the rear communication aperture 76 where natural ventilation air streams after collision with the front windshield 105 are vital to inflow, when the vehicle is running. Accordingly, when the vehicle is running, purge gases containing fuel gas (hydrogen gas) mixed with air for the dilution are pushed forth with, among others, flows of air blown by an air discharge fan 5 and natural ventilation air streams incoming through the rear communication aperture 76, to outflow through the front communication aperture 75 into atmosphere in a smoothed manner. Such being the case, the fuel cell apparatus 1 is adapted to smoothly discharge purge gases containing fuel gas (hydrogen gas) in a securely diluted state, thus allowing for an ensured enhancement of integrity.

According to this embodiment, in a side elevation of the vehicle 100, the fuel cell apparatus 1 has the combination of a first angle $\theta 1$ established by the first reference line A being a center line passing a center of the air inlet aperture area 62 and a center of the air outlet aperture area 63 of the diluter 6, relative to the vehicular horizontal plane H including a vehicle-longitudinally horizontal line, and a second angle $\theta 2$ established by the second reference line B being a center line passing a geometrical midpoint C of the dilution chamber 61 and a vehicle-longitudinally central position of the front communication aperture 75, relative to the vehicular horizontal plane H, such that the first angle $\theta 1$ is smaller than the second angle $\theta 2$. The first angle $\theta 1$ corresponds to the orientation of a normal line at the air outlet aperture area 63 of the dilution chamber 61, the second angle $\theta 2$ corresponding to the angle of elevation when looking up the central position of the front communication aperture 75 from the geometrical midpoint C of the dilution chamber 61. In other words, the dilution chamber 61 is inclined in a posture to oppose a vehicle-longitudinally rearward spatial position with respect to the central position of the front communication aperture 75. The dilution chamber 61 postured as described above is thus set up to ensure collisions between purge gases containing fuel gas (hydrogen gas) discharged from the diluter 6 and natural ventilation air streams incoming through the rear communication aperture 76. Accordingly, the fuel cell apparatus 1 is adapted to release purge gases containing fuel gas (hydrogen gas) as securely diluted, into atmosphere, in a straight manner.

According to this embodiment, the top member 73 of the cowl top peripheral wall 71 is provided with a planer guiding part 78, which is arranged in position to guide flows of air incoming through the rear communication aperture 76, toward the air outlet aperture area 63 of the diluter 6. Therefore, the planer guiding part 78 can serve to guide natural ventilation air streams incoming through the rear communication aperture 76, to make them straightly flow toward the diluter 6, for successful collisions between natural ventilation air streams and streams of purge gases containing fuel gas (hydrogen gas) discharged from the diluter 6 substantially in parallel with the first reference line A. This affords to provide streams of air with increased tendencies to mix with purge gases containing fuel gas (hydrogen gas) in the interior space 74 of the cowl top peripheral wall 71, thus allowing for purge gases containing fuel gas (hydrogen gas) to be surely diluted.

(Situations Needing Warm-Up)

Under a prescribed low-temperature environment, the shutter driver 213A is operated to close the shutters 213 at the first air intake ports 212. Concurrently with operation of the shutter driver 213A, the shutter drivers 232D are operated for driving the shutters 232C to open the second air intake ports 232A. Here, the prescribed low-temperature environment refers to a situation in which the outside air temperature is lower than a lower limit of an adequate range of temperatures for the fuel cell stacks 3 to operate as needed.

In this situation, the air discharge fans 5 are all driven for rotation. Hence, along with a startup of the fuel cell apparatus 1, warmed air is blown out of the air discharge port 42 at each fan cover 41. Then, as shown in FIG. 3, streams of warmed air F11 flow into the air suction duct 2, through the second air intake ports 232A. Thus taken warm air in the air suction duct 2 is introduced, through the air in-taking aperture area 31 at each fuel cell stack 3, into unit stacks 3U in the fuel cell stack 3, where it is used for reactions to generate electricity and early warm-up of the stacks 3U. Therefore, even in situations needing a warm-up, purge gases containing fuel gas (hydrogen gas) can be surely mixed with air for the dilution. Moreover, in this embodiment, the air inlet aperture area 62 of the diluter 6 is arranged to face a specific air discharge duct 4, affording for warm air passing air discharge ducts 4 else to stagnate as air for warm-up in the engine room 101.

(Situations Needing No Warm-Up)

The shutter drivers 232D are operable for driving the shutters 232C to close the second air intake ports 232A, in situations needing no warm-up of the fuel cell stacks 3, that is, when the outside air temperature resides in the adequate range of temperatures for the fuel cell stacks 3 to operate as needed. Since the second air intake ports 232A near the air discharge ports 42 of the air discharge ducts 4 are closed, streams of warm air from the air discharge ports 42 are kept from entering the air suction duct 2. In this situation, the shutters 213 at the first air intake ports 212 are open. It is noted that the hoods 232B of the second air intake ports 232A are vehicle-longitudinally rearward open, whereby natural ventilation air streams about the air suction duct 2 have reduced tendencies to strike into them.

In the above-noted situation involving the shutters 213 open at the first duct portion 210, the air discharge fans 5 exert suction pressures (negative pressures) prevailing up to the interior of the first duct portion 210, whereby as shown in FIG. 6, natural ventilation air streams F1 against the first duct portion 210 as well as ambient air about the first duct portion 210 are suctioned through the paired first air intake ports 212 of the first duct portion 210. Such streams of air join together at the second duct portion 220, constituting streams of air F2, and part at the third duct portion 230, into streams of air F3 and F4 to be introduced to the fuel cell stacks 3, respectively. Then, air is conducted in each fuel cell stack 3, and warmed air outflows, which is discharged through associated air discharge ducts 4. At a specific air discharge duct 4, discharged air flows into the diluter 6. Therefore, even in situations needing no warm-up, purge gases containing fuel gas (hydrogen gas) can be surely mixed with air for the dilution.

(Second Embodiment)

Figure 8:
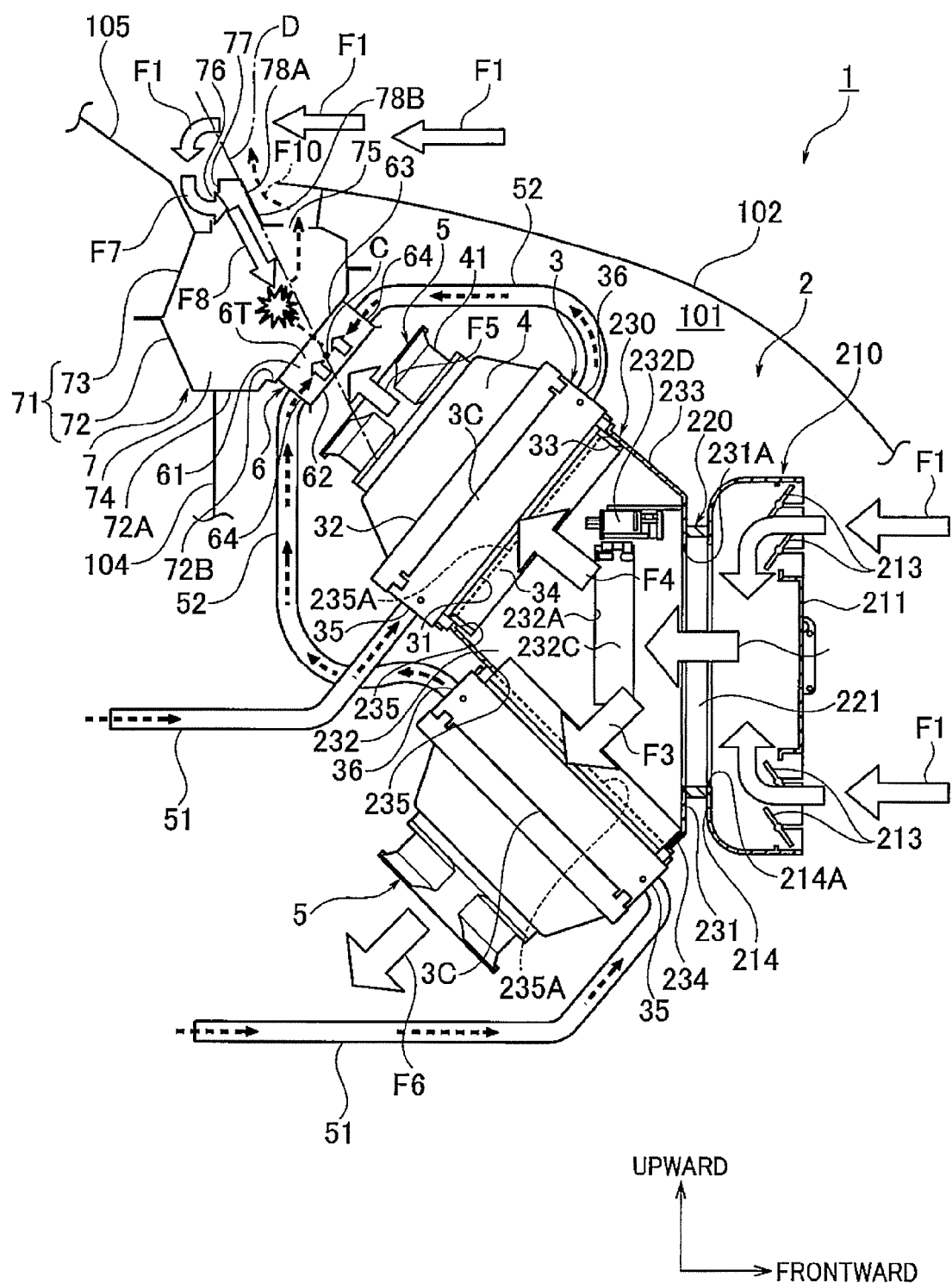
FIG. 8 is a sectional view of a fuel cell apparatus for vehicles according to a second embodiment of the preset invention.

FIG. 8 shows, in a sectional view, a fuel cell apparatus 1 according to a second embodiment of the present invention. Relative to the first embodiment, like constituent elements of the second embodiment are designated by like reference signs in FIG. 8, omitting redundant description. In this embodiment, a top member 73 of a cowl top peripheral wall 71 has a planer guiding part 78A. This part 78A of the top member 73 is vehicle-longitudinally inclined to provide an obverse side 78B thereof as a vehicle-longitudinally front guiding side defining a vehicle-longitudinally rear side of a front communication aperture 75, such that when extended at the lower end, the obverse side 78B has an imaginary extension as a plane including a geometrical midpoint C of a dilution chamber 61 in a diluter 6. The planer guiding part 78A is thus adapted to guide natural ventilation air streams incoming through a rear communication aperture 76 into an interior space 74 of the cowl top peripheral wall 71, surely causing to collide with streams of purge gases containing fuel gas (hydrogen gas) that have been diluted at the dilution chamber 61. Therefore, according to this embodiment, purge gases containing fuel gas (hydrogen gas) can be more surely mixed with air for the dilution.

(Other Embodiments)

Embodiments of the present invention have been described, including discussions and drawings constituting part of the disclosure, which should be construed as illustrative, not restrictive to the invention. There will be various substitute embodiments, examples, and application techniques made apparent to artisan from the disclosure.

For instance, embodiments described have a configuration including a pair of upper and lower fuel cell stacks 3 mounted on a third duct portion 230. However, there may be employed a structure including a single fuel cell stack 3, as it also is applicable. The present invention is applicable to any configuration including a fuel cell stack 3, an air discharge duct 4, an air discharge fan 5, a diluter 6, a cowl top 7, and a purge gas line 52 in a substantial way. Moreover, embodiments described include an air suction duct 2 and discharge ducts 4, of which structures also are not restrictive to this invention. Further, embodiments described have a configuration including air discharge fans 5 installed downstream of fuel cell stacks 3, which may be substituted with a configuration including air discharge fans 5 installed upstream of fuel cell stacks 3.

What is claimed is:

1. A fuel cell apparatus for vehicles including a fuel cell stack arranged in an engine room located in a vehicle front section and partitioned by a panel relative to a passenger room, and adapted to take in air through an air in-taking aperture area to use as a reaction gas and a coolant, and discharge air through an air discharging aperture area communicating with an interior space of an air discharge duct, the fuel cell apparatus comprising:
  a cowl top member comprising a tubular peripheral wall provided above the panel with an upper portion thereof extending along a lower edge of a front windshield, and a set of communication apertures formed through the upper portion of the tubular peripheral wall for air communication between atmosphere and an interior space of the tubular peripheral wall; and
  a diluter comprising an air inlet aperture area communicating with the interior space of the air discharge duct, an air outlet aperture area communicating with the interior space of the tubular peripheral wall, and a dilution chamber configured to introduce fuel gas discharged from the fuel cell stack, dilute introduced fuel gas with air introduced through the air inlet aperture area, and discharge diluted fuel gas through the air outlet aperture area.

2. The fuel cell apparatus for vehicles according to claim 1, wherein the set of communication apertures comprises:

a rear communication aperture configured to let in natural ventilation air streams after collision with the front windshield to the interior space of the tubular peripheral wall; and a front communication aperture vehicle-longitudinally frontward spaced from the rear communication aperture and configured to let out fuel gas additionally diluted with air, to atmosphere.

3. The fuel cell apparatus for vehicles according to claim 2, comprising in a vehicular side elevation a combination of a first reference line set up as a line passing a center of the air inlet aperture area and a center of the air outlet aperture area of the diluter and a second reference line set up as a line passing a geometrical midpoint of the dilution chamber and a vehicle-longitudinally central position of the front communication aperture, the first reference line being inclined relative to a vehicular horizontal plane at an angle smaller than an angle by which the second reference line is inclined relative to the vehicular horizontal plane.

4. The fuel cell apparatus for vehicles according to claim 2, comprising a planar guiding part disposed in a position facing the rear communication aperture of the tubular peripheral wall and configured to guide air introduced from the rear communication aperture toward the air outlet aperture area of the diluter.

5. The fuel cell apparatus for vehicles according to claim 1, comprising:

a fuel gas collector configured to collect fuel gas discharged from the fuel cell stack; and a fuel gas introducer configured to introduce fuel gas collected by the fuel gas collector into the dilution chamber of the diluter.

6. The fuel cell apparatus for vehicles according to claim 5, wherein the fuel gas collector comprise a purge gas line connected to the fuel cell stack, and the fuel gas introducer comprises a line connecting part provided between the purge gas line and the dilution chamber of the diluter.

7. The fuel cell apparatus for vehicles according to claim 1, wherein the air inlet aperture area of the diluter faces a discharge port of the air discharge duct.

8. The fuel cell apparatus for vehicles according to claim 7, comprising an air blowing fan provided at the discharge port of the air discharge duct.

9. The fuel cell apparatus for vehicles according to claim 1, wherein the tubular peripheral wall of the cowl top member comprises a lower portion cooperating with the upper portion of the tubular peripheral wall to define the interior space of the tubular peripheral wall, and the interior space of the tubular peripheral wall and the dilution chamber of the diluter communicates with each other through an aperture formed in the lower portion of the tubular peripheral wall.

10. The fuel cell apparatus for vehicles according to claim 9, wherein the lower portion of the tubular peripheral wall has a planer bottom region extending vehicle-longitudinally frontward from an upper edge of the panel.

* * * * *